(12) United States Patent
Lai (10) Patent No.: US 10,647,245 B1
(45) Date of Patent: May 12, 2020

(54) APPARATUS AND SYSTEM FOR A VEHICLE HEADLAMP ADJUSTER

(71) Applicant: Ching-Tsung Lai, Tainan (TW)

(72) Inventor: Ching-Tsung Lai, Tainan (TW)

(*) Notice: Subject to any disclaimer, the term of this patent is extended or adjusted under 35 U.S.C. 154(b) by 0 days.

(21) Appl. No.: 16/422,980

(22) Filed: May 25, 2019

(51) Int. Cl.
*B60Q 1/068* (2006.01)
*F21S 41/55* (2018.01)

(52) U.S. Cl.
CPC ............ *B60Q 1/0683* (2013.01); *F21S 41/55* (2018.01)

(58) Field of Classification Search
CPC .............................. B60Q 1/0683; B60Q 1/072
See application file for complete search history.

(56) References Cited

U.S. PATENT DOCUMENTS 6,206,556 B1 * 3/2001 Cook .................. B60Q 1/0683
362/485

FOREIGN PATENT DOCUMENTS

DE          1579381          7/1980

* cited by examiner

*Primary Examiner* — Anh T Mai
*Assistant Examiner* — Zachary J Snyder
(74) *Attorney, Agent, or Firm* — Alexander Chen, Esq.

(57) ABSTRACT

A headlamp adjustment system comprises a headlamp that, in turn, comprises a headlamp outer lens and headlamp housing. The headlamp adjustment system further comprises a headlamp adjustment bracket, an adjustment screw, a flexible shaft, near and far shaft ends, short and long tabs, a U clamp, a bolt that fastens the straight half, the U-shape half, and, thus, the U clamp together to the long tab, and, thus, the headlamp housing.

7 Claims, 7 Drawing Sheets

APPARATUS AND SYSTEM FOR A VEHICLE HEADLAMP ADJUSTER

FIELD OF THE INVENTION

The present invention generally relates to automobile components, and more specifically to a vehicle headlamp adjuster.

BACKGROUND OF THE INVENTION

There is a chance that an automobile owner needs to adjust the headlamp aim of the vehicle headlamp assembly. Sometimes it is simply because the owner prefers higher or lower beams. Other times, for safety reasons, it is important to avoid directing the headlamp aim in a direction that may shine directly into the eyes of oncoming traffic. Recognizing these needs, manufacturers make most headlamp assemblies incorporating a means of adjusting the headlamp aim relative to a given vehicle configuration.

In the past, many headlamp assemblies were designed so that the entire headlamp assembly (lens, headlamp, and housing) could be tilted for a desired aim. However, it is often desirable to have a headlamp assembly that is flush mounted and follows the contours of the vehicle's body panels to enhance aerodynamics or styling, and the seam where the headlamp's circumference meets the vehicle's body sealed so the vehicle's inner body and/or electrical components are protected from water. Thus, modern headlamps have a fixed outer headlamp lens, and movable reflector, bulb, and other components. In a headlamp assembly with a fixed outer lens, the headlamp typically can be tilted within the housing relative to the fixed outer lens for headlamp aim adjustment.

Various adjustment mechanisms for adjusting headlamp aim have been disclosed. Past and current adjustment mechanisms have an adjustment screw that engages with either the vehicle chassis or the headlamp assembly to push/pull the headlamp actuating a tilt in the headlamp relative to the vehicle chassis or relative to the headlamp assembly in a fixed lens assembly. In the past, the adjustment screw was typically turned by engaging the screw head with a tool directly. For example, many headlamp adjustment mechanisms found on passenger cars and pickup trucks have at least one adjustment screw that has a slot formed in the screw head adapted to receive a phillips-head screwdriver.

For headlamp assemblies without a fixed outer lens, the headlamp aim can be adjusted from outside the vehicle with a screwdriver directly. Other vehicle configurations only provide access to the headlamp adjusters from within the engine bay, which means the hood needs to be open during adjustment. For headlamp assemblies with a fixed outer lens, the headlamp adjusters must be accessed from within the engine bay area, from the backside of the body panel, or from underneath the vehicle because the adjuster is only accessible from the rear of the vehicle.

Obviously the cumbersome accessibility hinders the vehicle maintenance and repair, and increases repair cost. Furthermore, in some configurations, for example, vehicles with their headlamp assemblies are mounted to the hood, the requirement that the hood must be open would not be very practical because it is impossible to adjust the headlamp's aim when it was in a high up position with the opened hood, and pointing at a different direction other than the horizontal direction. Thus, in such vehicle configurations, it is desirable to adjust the headlamp's aim when the headlamp is in its normal operating position, somewhat horizontal to the ground; i.e., with the hood closed.

OBJECT OF THE INVENTION

Accordingly, it is an object of this invention to provide an easily accessed headlamp adjuster.

It is an object of the invention to provide an easy and uncostly repair of headlamp assembly.

It is an object of the invention to provide a headlamp adjuster within a headlamp assembly with a fixed outer headlamp lens that can be adjusted from the exterior of the headlamp and vehicle.

It is an object of the invention to provide a headlamp adjuster that can be adjuster with a standard screwdriver.

SUMMARY OF INVENTION

A headlamp adjustment system comprises a headlamp that, in turn, comprises a headlamp outer lens and headlamp housing. The headlamp adjustment system further comprises a headlamp adjustment bracket that is attached to the headlamp housing. The headlamp adjustment bracket is adapted to adjust an aim of the headlamp relative to the headlamp outer lens. The headlamp adjustment system further comprises an adjustment screw disposed within the adjustment bracket, and the adjustment screw is adapted to control a tilt movement for the aim of the headlamp. The adjustment screw rotates about its longitudinal axis when the aim is being adjusted. The headlamp adjustment system further comprises a flexible shaft having a near shaft end and a far shaft end. The far shaft end is rotatably connected to the adjustment screw's head such that a rotation of the flexible shaft actuates a rotation of the far shaft end, which, in turn, actuates a rotation of the adjustment screw about the adjustment screw's longitudinal axis. The far shaft end's longitudinal axis does not need to axially align with the near shaft end's. The headlamp adjustment system further comprises a long tab and a short tab that are molded to the headlamp housing. The long tab has a female threaded bore in about the center of its end. The short tab also has a bore in about the center of its end. The headlamp adjustment system further comprises a U clamp that comprises a straight half and a U-shape half. The straight half further comprises a bore through a first end of its ends, and a protruding tab from a second end of its ends where the protruding tab is perpendicular to the straight half s longitudinal axis. The U-shape half further comprises a first bore through a first end of its ends, and a second bore through a second end of its ends. The headlamp adjustment system further comprises a bolt that is male threaded so that the bolt can mate with the female threaded bore of the long tab. The bolt fastens the straight half, the U-shape half, and, thus, the U clamp together to the long tab, and, thus, the headlamp housing. The near shaft end further comprises a head that has a diameter larger than the U clamp's inner diameter, a smaller diameter cylindrical section that has a diameter smaller than the U clamp's inner diameter, and a larger diameter cylindrical section that has a diameter larger than the U clamp's inner diameter. In this arrangement, the near shaft end interlocks within the U clamp such that the U clamp retains a position of the near shaft end relative to the U clamp, the long tab, the short tab, and the headlamp housing. The U clamp allows the near shaft end to rotate within and about the near shaft end's longitudinal axis.

In one embodiment, the near shaft end is accessible through a hole formed in the headlamp outer lens and, thus, the aim can be adjusted from the exterior of the headlamp.

In another embodiment, the near shaft end comprises a slot on its head and being adapted to receive a phillips-head screwdriver.

In another embodiment, the near shaft end comprises a slot on its head and being adapted to receive a straight-head screwdriver.

In another embodiment, the near shaft end comprises a slot on its head and being adapted to receive a Torx-head screwdriver.

In another embodiment, the near shaft end comprises a slot on its head and being adapted to receive a square-head screwdriver.

In another embodiment, the near shaft end comprises a slot on its head and being adapted to receive a hex-head screwdriver.

BRIEF DESCRIPTION OF THE DRAWINGS

These and other features and advantages of the invention will not be described with reference to the drawings of certain preferred embodiments, which are intended to illustrate and not to limit the invention, and in which.

DETAILED DESCRIPTION OF THE INVENTION

Some embodiments are described in detail with reference to the related drawings. Additional embodiments, features, and/or advantages will become apparent from the ensuing description or may be learned by practicing the invention. The following description is not to be taken in a limiting sense, but is made merely for the purpose of describing the general principles of the invention. The steps described herein for performing methods form one embodiment of the invention, and, unless otherwise indicated, not all of the steps must necessarily be performed to practice the invention, nor must the steps necessarily be performed in the order listed. It should be noted that references to "an" or "one" or "some" embodiment(s) in this disclosure are not necessarily to the same embodiment, and such references mean at least one.

The present invention has been conceived with the aim of addressing one or more of the current headlamp adjuster problems. More specifically, the present invention is directed to an apparatus and system of a headlamp adjuster that allows easy access and easy and uncostly repairs.

Figure 1:
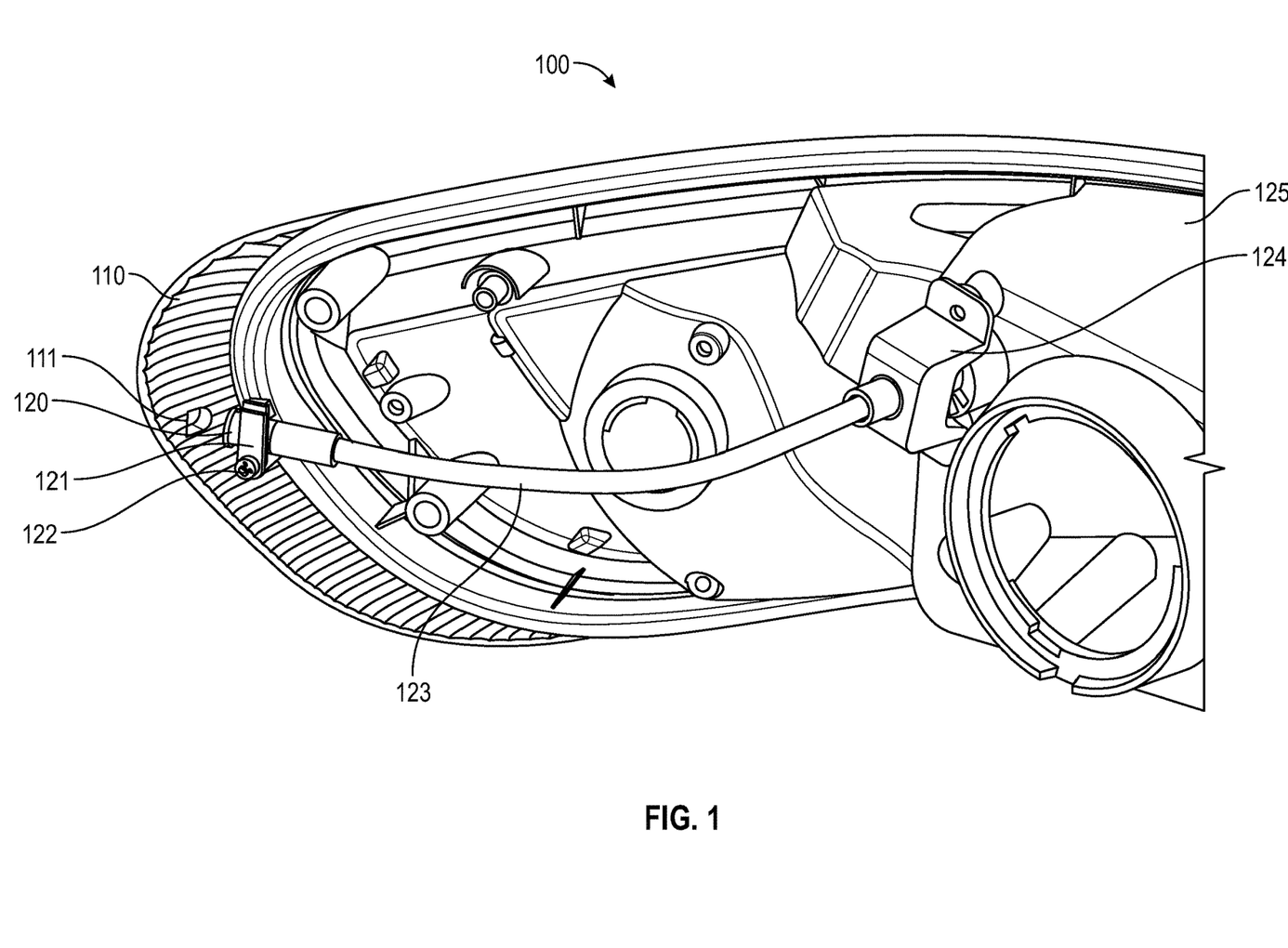
FIG. 1 is a perspective view of an embodiment of the current invention's vehicle headlamp adjuster.

Referring to FIG. 1, a perspective view of an exemplary embodiment 100 of the current invention is shown. The headlamp adjustment system 100 comprises a headlamp housing 101, a fixed outer headlamp lens 110 and a hole 111 is formed thereon. Said fixed outer headlamp lens 110 is attached to the vehicle's panel, and thus stationary relative to other components. It is appreciated where necessary the hole 111 is waterproof to protect the electrical components of the headlamp. The embodiment 100 further comprises a first or near shaft end component 120, mounting bracket 121, mounting bracket screw 122, flexible shaft 123, and an adjustment bracket 124 that, on one side, connects with the second or remote end (not shown) of the flexible shaft 123 but allows said second end and the shaft 123 rotate about the shaft's longitudinal axis, and, on the other side, attaches to the headlamp housing 125.

The hole 111 provides access to the shaft end 120 from the exterior of the vehicle. A slot (not shown) that is made to receive a Torx-head screwdriver tip is formed in the shaft end 120. It is appreciated that other shaped slots, such as Phillips, slotted, Hex or Allend socket, square, etc., are also contemplated. Thus, a Torx-head screwdriver can be inserted through the hole to engage the second shaft end 120. And when the screwdriver is rotated, the rotation of the screwdriver will actuate substantially the same rotation in the shaft 123. The rotation of the shaft 123 actuates substantially the same rotation at the second shaft end. In turn, the second shaft end actuates the pushes or pulls of the headlamp housing 125, and, thus, adjust the headlamp's aim. As disclosed, the current invention allows the headlamp aim to be adjusted from the exterior of a vehicle. It is appreciated that because the shaft's end 120 of the shaft 123 does not move along its longitudinal axis and only rotates about the shaft's longitudinal axis, the positions of the hole 111 and the mounting bracket could be anywhere on the chassis of the vehicle. Another important aspect of the present invention is that the shaft's axis at the far end does not need to axially align with the axis of the near shaft end nor the screw's axis. The angle between the axis of the near shaft end and of the far shaft end can vary for any given application.

Figure 2:
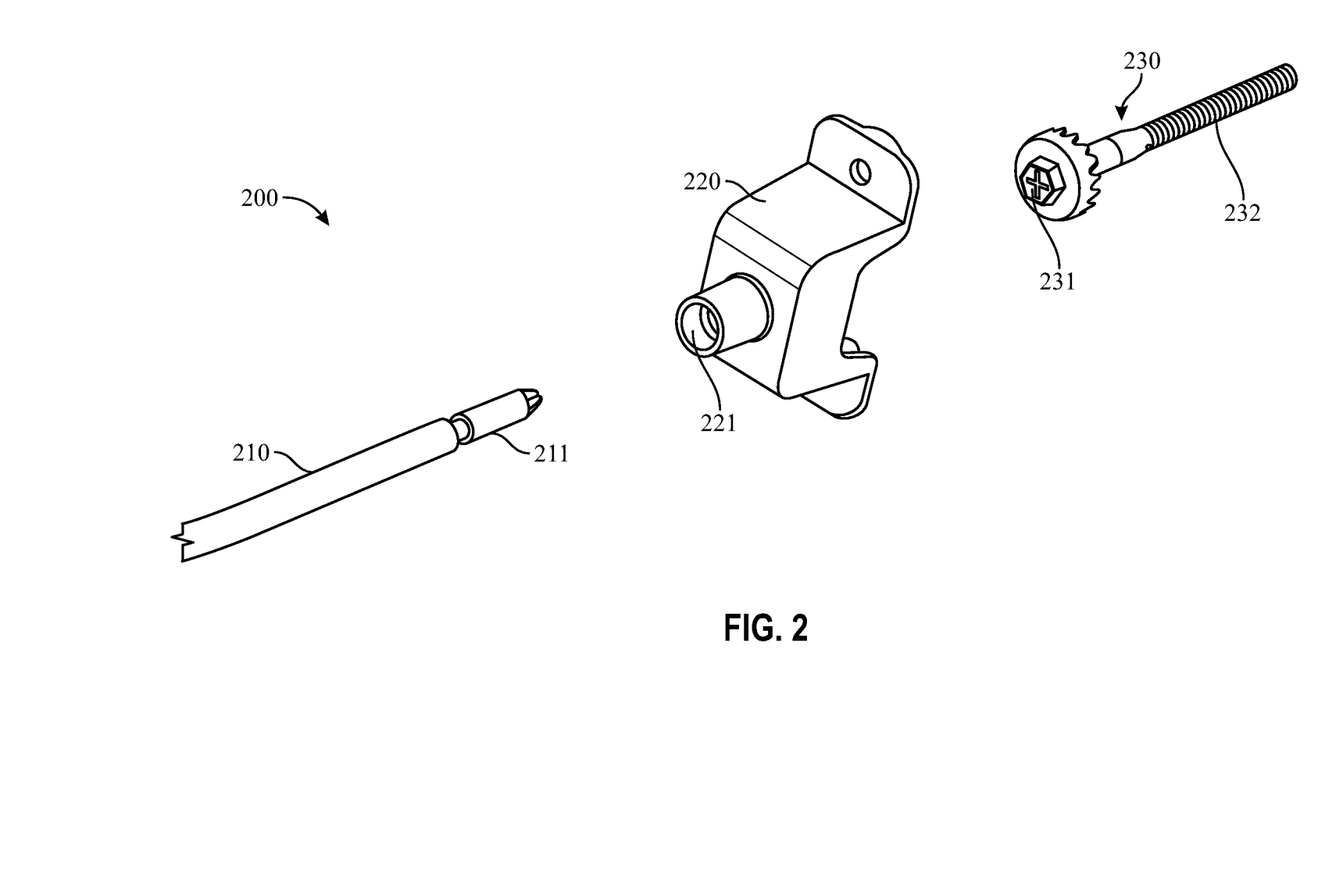
FIG. 2 is an exploded view of the far end of an embodiment of the current invention.

Referring to FIG. 2, an exploded view of an assembly of the second end 200 of the current invention is shown. As disclosed above, the rotation of the shaft 210 actuates the rotation of the second shaft end 211 which, when fully assembled, is disposed within the adjustment bracket 220. The second shaft end 211, in turn, actuates substantially the same rotation in the adjustment screw 230. The rotation of the adjustment screw 230 then actuates the tilting of the attached headlamp housing, as shown in FIG. 1. Turning the shaft 210, shaft end 211, and adjustment screw 230 in one rotational direction will cause the adjustment screw to move inward relative to the adjustment bracket 220 and the headlamp housing via the thread pattern 232 formed on the adjustment screw 230. Similarly, turning the shaft 210, shaft end 211, and adjustment screw 230 in the opposite direction will cause the screw to move outward relative to the adjustment bracket 220 and the headlamp housing. As the adjustment screw 230 moves inward or outward relative to the adjustment bracket 220, it actuates a tilt movement of an attached headlamp, thereby adjusting the headlamp aim. With the current invention's apparatus and system, the adjustment screw 230 can be adjusted from the vehicle's exterior via the flexible shaft 210.

Still referring to FIG. 2, in one embodiment, the shaft end 211 is shaped as a Phillips screwdriver that will mate with the Phillips screw head 231 of the adjustment screw 230 such that when the shaft 210 and, thus, shaft end 211 are being turned, the adjustment screw 230 is also being turned, and moved inward or outward relative to the adjustment bracket 220. As such, the embodiment of the current invention actuates a tilt movement of an attached headlamp, thereby adjusting the headlamp's aim.

Figure 3:
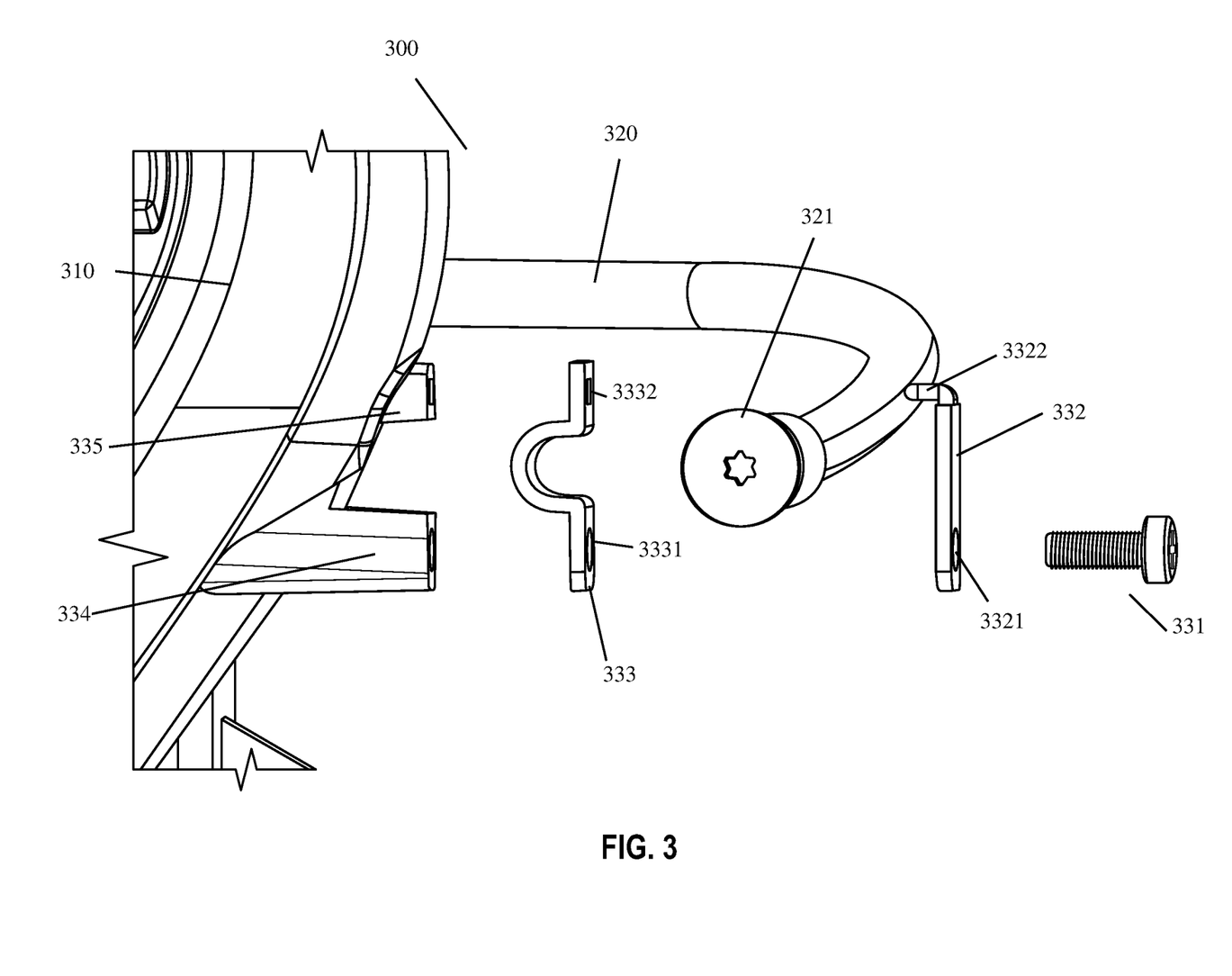
FIG. 3 is an exploded view of the near end of an embodiment of the current invention.

FIG. 3 is an exploded view of an exemplary embodiment 300 of the current invention. This embodiment 300 comprises a headlamp housing 310, a flexible shaft 320, a near shaft end 321 (as opposed to the far shaft end which is not shown here but is attached to the headlamp housing as shown in FIGS. 1 and 2), a bolt 331, straight half 332 of a U-clamp, U-shape half 333 of said U-clamp, a long tab 334, and a short tab 335. The near shaft end 321 further has a Torx-shape end formed to receive a Torx screwdriver. The straight half 332 further comprises a bore 3321 at one end and a protruding tab 3322 at the other end. In one embodiment, the protruding tab 3322 has a thicker tip such that it functions as a hook. The bore 3321 is made to let the male threaded part of the bolt 331 through such that the bolt 331 can engage with the female threaded bore in long tab 334. The U-shape half 33 further comprises a bore 3331 at one end, and another bore 3332 at the other end. The bore 3331 allows the bolt 331 through so it can engage with the bore in the long tab 334. The bore 3332 allows the protruding tab 3322 through so it can engage with the bore in the short tab 335. In one embodiment, the bore in the short tab 335 has a cavity on its wall to receive the thick tip of the protruding tab 3322, as disclosed above. Once the thick tip of the protruding tab 3322 engages with the cavity on the wall of the bore of the short tab 335, it prevents the straight half 332 from detaching horizontally from the assembly. With this assembly, to detach the straight half 332, one must first move the straight half 332 vertically up so the protruding tab disengages the cavity in the bore of the short tab 335, and, next, move the straight half 332 away from short tab 335 horizontally. Besides the long and short tabs, 334 and 335, which are molded to the headlamp housing, all other components of the U clamp are detachable and replaceable individually thus repairs are much easier and less costly.

Figure 4:
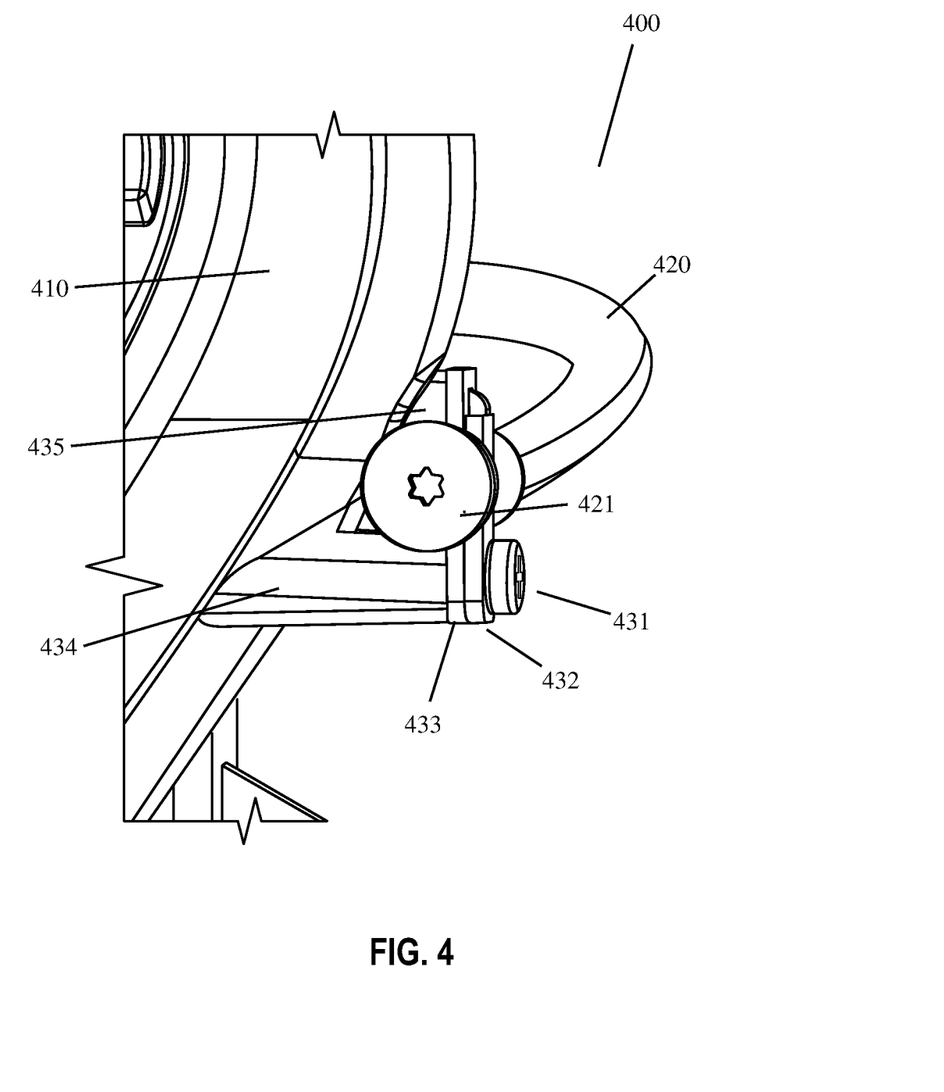
FIG. 4 illustrates the near end of an embodiment of the current invention where it is fully assembled.

FIG. 4 illustrates another exemplary embodiment 400 of the current invention where it is fully assembled. Similar to the embodiment illustrated in FIG. 3, this embodiment 400 comprises a headlamp housing 410, a flexible shaft 420, a near shaft end 421, a bolt 431, straight half 432 of a U-clamp, U-shape half 433 of said U-clamp, a long tab 434, and a short tab 435. The long and short tabs, 434 and 435, are stationarily attached to the headlamp's housing 410. The two halves of the U-clamp, 432 and 433, are attached to the long tab 434 by the bolt 431. The U shape of the clamp accommodates the shaft's end where the diameter thereof is the smallest. Since the head of the shaft's end and the far half of the shaft have larger diameters, the U clamp interlocks the shaft and its end, and retains their positions relative to the long, short tabs, 434 and 435, and the headlamp housing 410. The shaft cannot move along its longitudinal axis. However, the shaft can rotate about its longitudinal axis within the U clamp.

Figure 5:
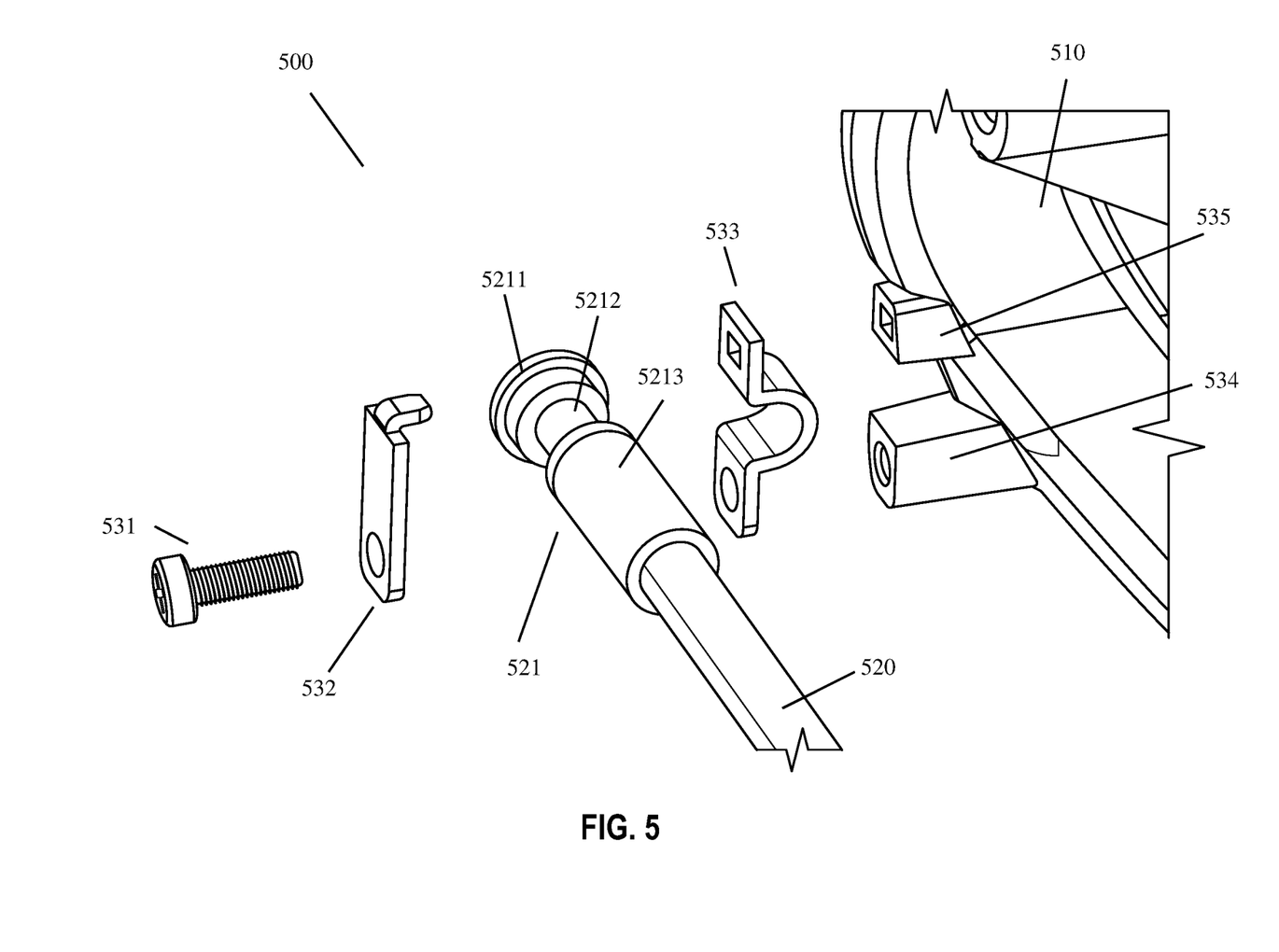
FIG. 5 is an exploded back view of the near end of an embodiment of the current invention.

FIG. 5 is an exploded back view of another exemplary embodiment 500 of the current invention. Similar to the embodiments disclosed in FIGS. 3 and 4, this embodiment 500 comprises a headlamp housing 510, a flexible shaft 520, a near shaft end 521, a bolt 531, straight half 532 of a U-clamp, U-shape half 533 of said U-clamp, a long tab 534, and a short tab 535. In this embodiment, the near shaft end 521 further comprises a larger diameter head 5211 that has a Torx or Phillips slot formed therein, a smaller diameter cylindrical body 5212, and a larger diameter cylindrical body 5213 that is partially hollow. The head's 5211 and cylindrical body's 5213 diameters are larger than the inner diameter of the U clamp. And the cylindrical body 5212 diameter is smaller than the U clamp's inner diameter. As such, when fully assembled, the U clamp interlocks the shaft end, and retains the shaft end's and, thus, the shaft's positions relative to the long and short tabs, 534 and 535, and the headlamp housing 510. But the U clamp's larger diameter allows the cylindrical body 5212 to rotate within it, and, thus, allows the shaft 520 to rotate about its longitudinal axis.

Still referring to FIG. 5, the larger cylindrical body 5213 is partially hollow to receive the flexible shaft 520. The cylindrical body 5213 fits over the flexible shaft 520 and engages the shaft so that the near shaft end 521 and the shaft are connected. A part of the shaft is disposed within the cylindrical body 5213. In one embodiment, the shaft and shaft end attachment relies entirely on the elasticity force of the cylindrical body 5213, and the friction between the parts. In other embodiments, different fastening methods are contemplated, such as glue, threaded bolt and nut, etc.

Figure 6:
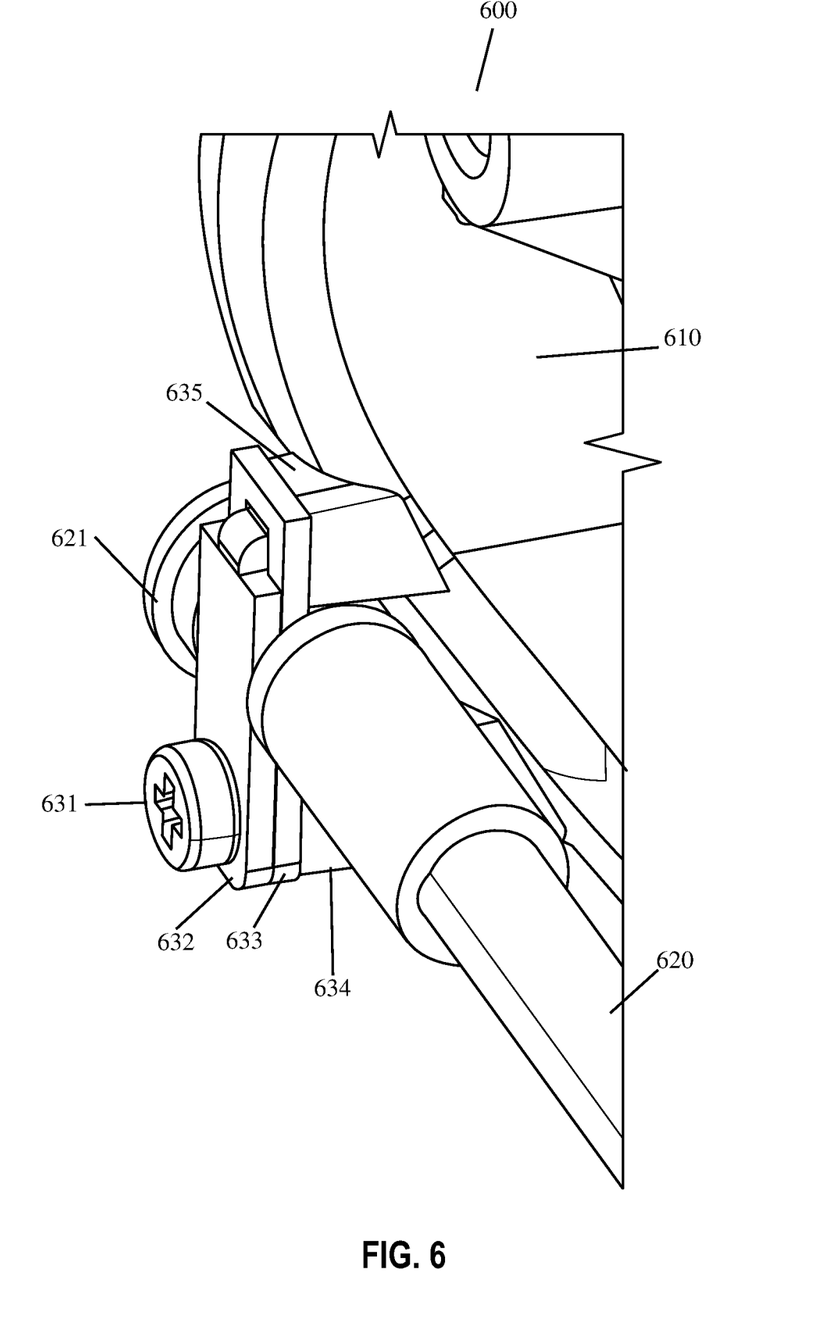
FIG. 6 illustrates the back view of the near end of an embodiment of the current invention where it is fully assembled.

FIG. 6 illustrates an exemplary embodiment 600 of the current invention. Similar to the embodiments illustrated in FIGS. 3, 4, and 5, this embodiment 600 comprises a headlamp housing 610, flexible shaft 620, near shaft end 621, bolt 631, straight half 632 of a U-clamp, U-shape half 633 of said U-clamp, long tab 634, and short tab 635. The long and short tabs, 634 and 635, are stationarily attached to the headlamp's housing 610. The two halves of the U-clamp, 632 and 633, are attached to the long tab 634 by the bolt 631. When fully assembled, the U clamp interlocks the shaft end 621 by the smaller diameter section thereof, and retains its position relative to the stationary long and short tabs, 634 and 635, and the headlamp housing 610. However, the smaller diameter section of the shaft end 621 can rotate freely about its longitudinal axis, and actuates the shaft's and, thus, the far end adjustment screw's rotation, and actuates the pushes and pulls of the headlamp.

Figure 7:
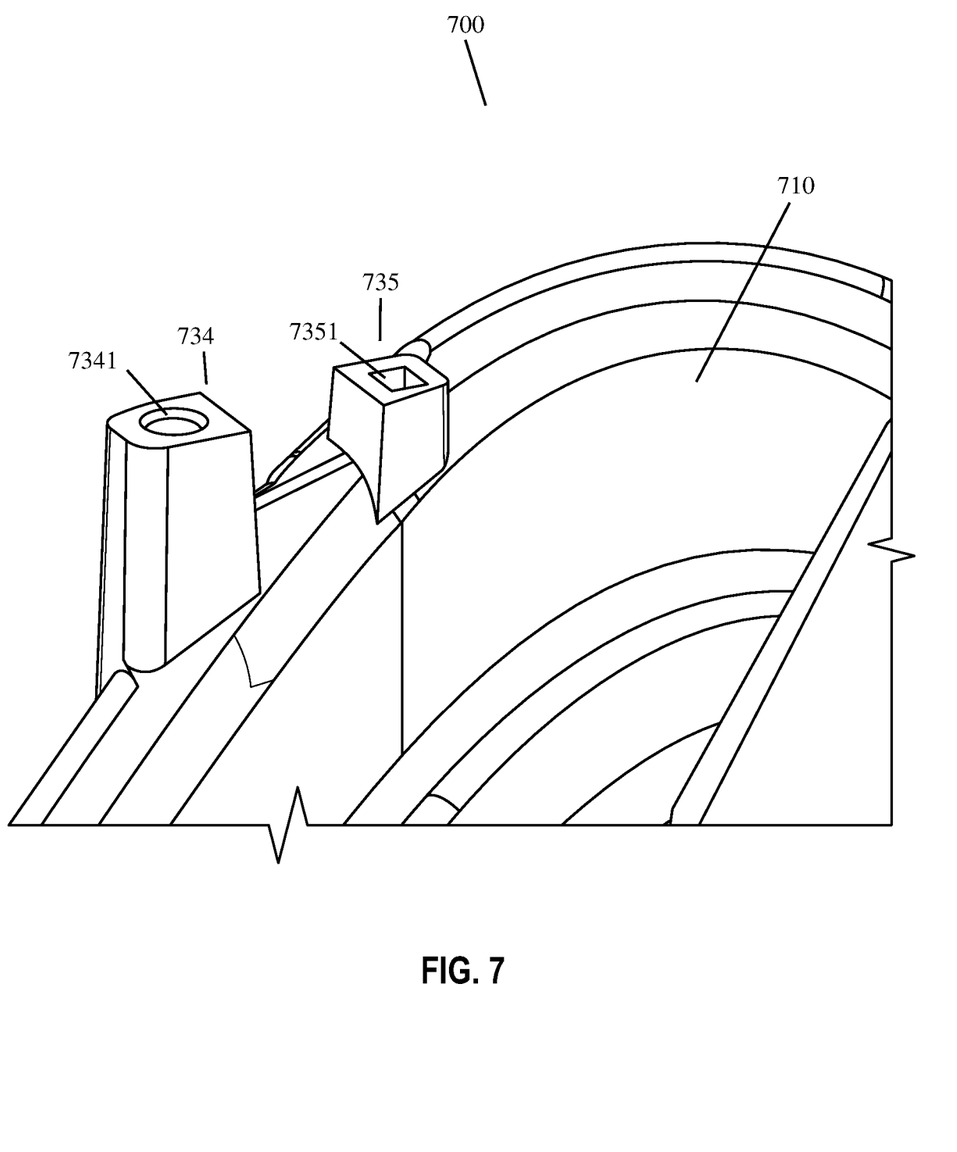
FIG. 7 illustrates long and short tabs that form a mounting bracket of an embodiment of the current invention.

FIG. 7 illustrates a close-up view of another embodiment 700 of the current invention. The long and short tabs, 734 and 735, that are parts of the mounting bracket of the current invention are shown. As disclosed above and in this embodiment, the long and short tabs, 734 and 735, are molded to the headlamp housing. However, it is contemplated that the tabs can be disposed at other locations within the vehicle because the tabs' and U clamp's function is to retain the near shaft end and shaft stationary relative to the tabs, but allow the shaft rotate about its longitudinal axis. In this embodiment, the long tab 734 has a bore 7341 in about the center of the tab's end and that extends along the tab's longitudinal axis. The bore is long enough to receive the bolt disclosed above and shown in FIGS. 3, 4, and 5. The bore is threaded with female threads. The short tab 735 also has a square bore 7351 in about the center of the tab's end. The square bore is formed to receive the protruding tab of the straight half of the U clamp disclosed above and shown in FIGS. 3, 4, and 5. It is not shown but, in one embodiment, on the wall of the square bore 7351 a cavity is formed to receive the thicker tip of the protruding tab of the straight half of the U clamp. Once the thicker tip engages the cavity, the straight half cannot be detached from the U clamp without the thicker tip being disengaged from the cavity.

The invention claimed is:
1. A headlamp adjustment system, comprising:
A headlamp that comprises a headlamp outer lens and a headlamp housing;
a headlamp adjustment bracket attached to said headlamp housing wherein said headlamp adjustment bracket being adapted to adjust an aim of said headlamp relative to said headlamp outer lens;

an adjustment screw disposed within said adjustment bracket wherein said adjustment screw rotates about its longitudinal axis when said aim is being adjusted;

a flexible shaft having a near shaft end and a far shaft end;

wherein said far shaft end being rotatably connected to said adjustment screw's head such that rotation of said shaft actuates a rotation of said far shaft end, which, in turn, actuates a rotation said adjustment screw about said adjustment screw's longitudinal axis;

wherein said far shaft end's longitudinal axis does not need to axially align with said near shaft end's;

a long tab and a short tab that are molded to said headlamp housing;

wherein said long tab has a female threaded bore in about the center of its end; wherein said short tab also had a bore in about the center of its end;

a U clamp that comprises a straight half and a U-shape half; wherein said straight half further comprises a bore through a first end of its ends, and a protruding tab from a second end of its ends wherein said protruding tab is perpendicular to said straight half's longitudinal axis; wherein said U-shape half further comprises a first bore through a first end of its ends, and a second bore through a second end of its ends;

a bolt that is male threaded wherein said bolt can mate with said female threaded bore of said long tab; wherein said bolt fastens said straight half, said U-shape half, and, thus, said U clamp together to said long tab, and, thus, said headlamp housing;

wherein said near shaft end further comprises a head that has a diameter larger than said U clamp's inner diameter; wherein said near shaft end further comprises a smaller diameter cylindrical section that has a diameter smaller than said U clamp's inner diameter; wherein said near shaft end further comprises a larger diameter cylindrical section that has a diameter larger than said U clamp's inner diameter;

wherein said near shaft end interlocks within said U clamp such that said U clamp retains a position of said near shaft end relative to said U clamp, said long tab, said short tab, and said headlamp housing;

wherein said U clamp allows said near shaft end to rotate within and about said near shaft end's longitudinal axis.

2. A headlamp adjustment system of claim 1, wherein said near shaft end is accessible through a hole formed in said headlamp outer lends and, thus, said aim can be adjusted from the exterior of said headlamp.

3. A headlamp adjustment system of claim 1, wherein said near shaft end comprises a slot on its head and being adapted to receive a phillips-head screwdriver.

4. A headlamp adjustment system of claim 1, wherein said near shaft end comprises a slot on its head and being adapted to receive a straight-head screwdriver.

5. A headlamp adjustment system of claim 1, wherein said near shaft end comprises a slot on its head and being adapted to receive a Torx-head screwdriver.

6. A headlamp adjustment system of claim 1, wherein near shaft end comprises a slot on its head and being adapted to receive a square-head screwdriver.

7. A headlamp adjustment system of claim 1, wherein said near shaft end comprises a slot on its head and being adapted to receive a hex-head screwdriver.

\* \* \* \* \*